Patented Nov. 28, 1922.

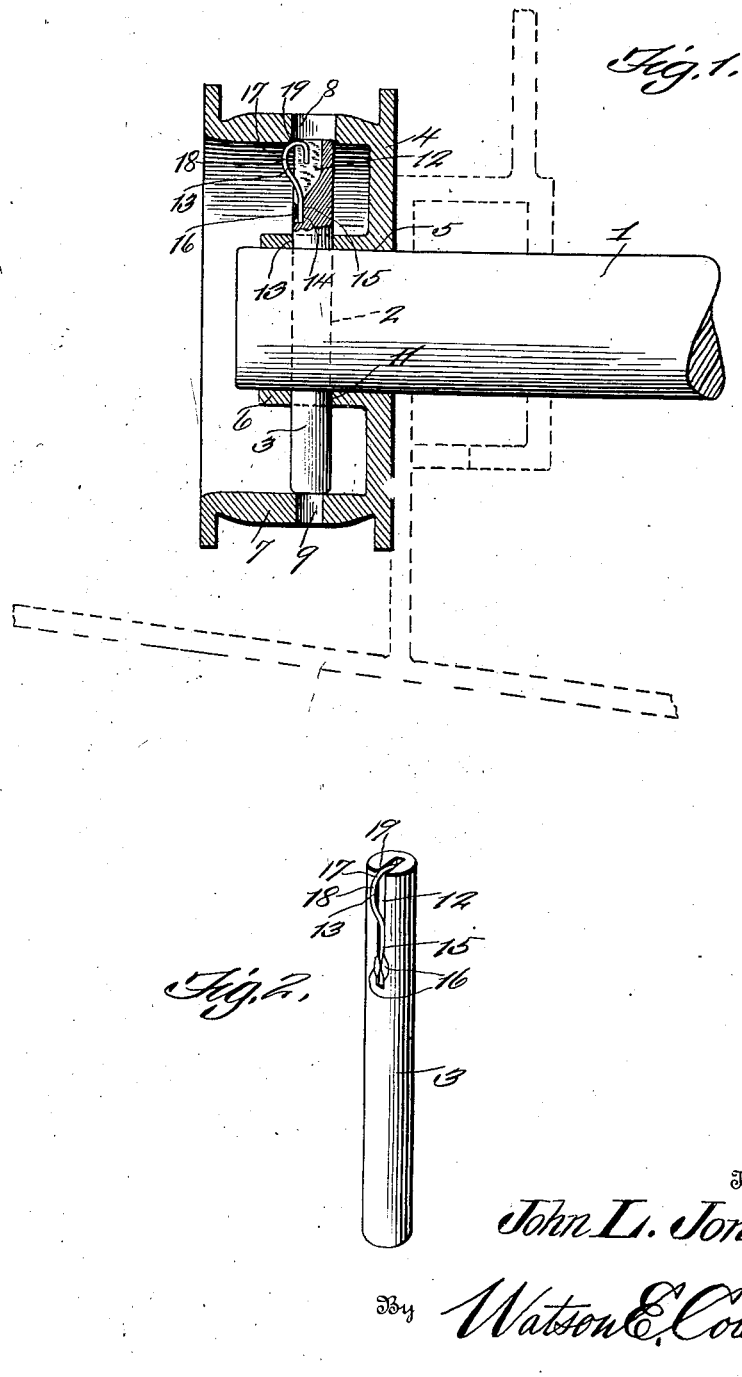

1,437,108

UNITED STATES PATENT OFFICE.

JOHN L. JONES, OF DRESDEN, TENNESSEE.

FAN PULLEY PIN.

Application filed February 18, 1922. Serial No. 537,523.

*To all whom it may concern:*

Be it known that I, JOHN L. JONES, a citizen of the United States, residing at Dresden, in the county of Weakley and State of Tennessee, have invented certain new and useful Improvements in Fan Pulley Pins, of which the following is a specification, reference being had to the accompanying drawings.

Heretofore pulley pins have been secured in place by means of cotter pins, and other devices, which have been found more or less difficult to apply and remove, when the pulley needs repairs, or a new pulley is to be applied to the motor shaft.

The present invention has for its purpose the provision of a pulley pin, which carries means to hold the pin in position after once being inserted.

Another purpose is the provision of a pulley having openings through the perimeter of the pulley and through the boss at right angles to the opening, which receives the motor shaft, for the reception of the pulley pin, there being means carried on the pin engaging the inner surface of the perimeter of the pulley to hold the pin in place and against movement in one direction. One of the openings in the perimeter of the pulley is smaller than the opposite opening, therefore the pin cannot drop therethrough, hence the pin will abut the inner surface of the perimeter of the pulley axially aligned with and adjacent the smaller opening thereby preventing movement of the pin in the opposite direction.

A still further purpose has to do with utilizing the smaller opening of the perimeter to receive a small tool, by which the pulley pin may be driven out through the larger opening of the perimeter when it is desired to replace the worn pulley with a new one.

While the design and construction at present illustrated and set forth are deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view of a motor shaft including a fan belt pulley thereon and in section, showing the pulley pin as applied;

Figure 2 is a detail perspective view of the pulley pin.

Referring to the drawings, 1 designates a motor shaft, which is provided with a transverse opening 2 for the reception of a pulley pin 3. Mounted upon the motor shaft is a fan belt pulley 4, which is of a general construction, and formed concentrically with the opening 5 (which receives the motor shaft) is a sleeve, collar, or boss 6.

The perimeter 7 of the pulley is provided with diametrically opposite openings 8 and 9, which are axially concentric with the openings 10 and 11, which are formed diametrically opposite each other in the sleeve or collar 6.

When the pulley 4 is applied to the shaft 1, it is arranged so that the openings 8, 9, 10 and 11 will register axially concentric with the opening or passage 2, for the reception of the pulley pin 3.

It will be noted that the pulley pin 3 is inserted in place, by first fitting the same through the opening 8, and then through the opening 10, and openings 2 and 11. It will be noted that neither end of the pin 3 can pass through the opening 9, since it is of less diameter than the pin, and also of less diameter than the openings 8, 10, 2 and 11.

One end of the pin 3 has a recess or slot 12 which is of substantial depth and length, sufficient to receive the wire spring 13. One end of the recess 12, in fact its inner end 14, is of considerable less depth than the outer end of the recess, and in which the end 15 of the wire spring is secured, by swaging or upsetting the walls of the inner end of the recess as at 16 and causing the walls to clinch and hold the spring wire in position. The spring is anchored, so that the loop end 17 may move back and forth in the larger end of the recess. The curved portion 18 of the loop of the spring projects beyond the surface of the pin 3, in order that the outer end curvature of the loop as at 19 may constitute a shoulder to engage the inner surface of the perimeter of the pulley, immediately adjacent the opening 8, thereby preventing the pulley pin 3 from moving in one direction.

Since the opening 9 is of a substantially less diameter than the pin 3 and the openings 8, 9, 10, 2 and 11, the end of the pin opposite the spring cannot pass through the opening 9, but will bear against the inner surface of the perimeter of the pulley at a point immediately adjacent the opening 9, thereby limiting the pin in its movement in the opposite direction. By this construction the pin, after once being inserted will be retained in place, and will act to prevent accidental detachment of the fan belt pulley.

However, though the opening 9 is of less diameter than the openings 8, 10, 2 and 11 it serves a very important function. For instance the opening 9 will permit of the insertion of a small tool, which may engage the end of the pin opposite the spring, and by imparting hammer blows on the tool, the pin may be driven out of its bearings, in fact driven through the openings 8, 10, 2 and 11, sufficiently to permit the removal of the pulley, if the case requires, for replacing the same with a new one. The hammer blows upon the tool should be sufficient, to cause the spring to depress or move into the recess 12, and in moving into such position, the elongated curved portion of the loop of the pin will cam on the margin of the opening 8, until the spring depresses and allows the fan belt pulley pin to be entirely removed, and the pulley detached.

The invention having been set forth, what is claimed is:—

As an article of manufacture, a fan pulley pin having an elongated recess at one end, one end of the recess being of substantial less depth than the other end, a spring member secured in said shallower portion of the recess, said spring means comprising a spring loop extending part way into the portion of the recess of greater depth, and having a part extending beyond the surface of the pin, adapted to bear against the margin of an opening in the pulley flange to cause the spring means to depress into said recess, the walls of the shallower portion of the recess being swaged or upset to hold the spring means in position.

In testimony whereof I hereunto affix my signature.

JOHN L. JONES.